No. 620,286. Patented Feb. 28, 1899.
G. P. DODGE.
RUBBER ROLL.
(Application filed Feb. 23, 1897.)
(No Model.)
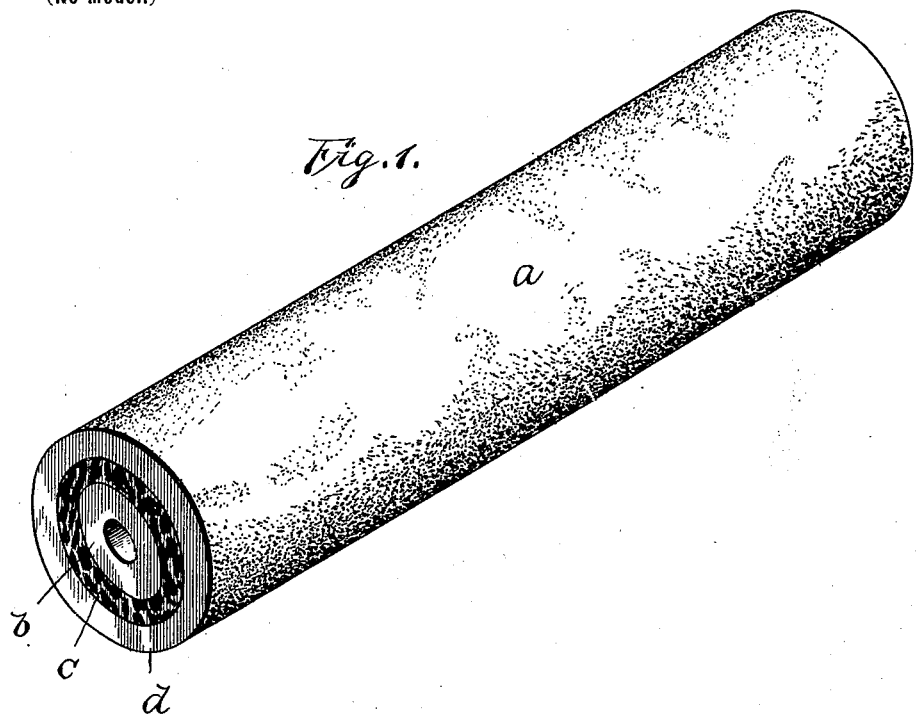
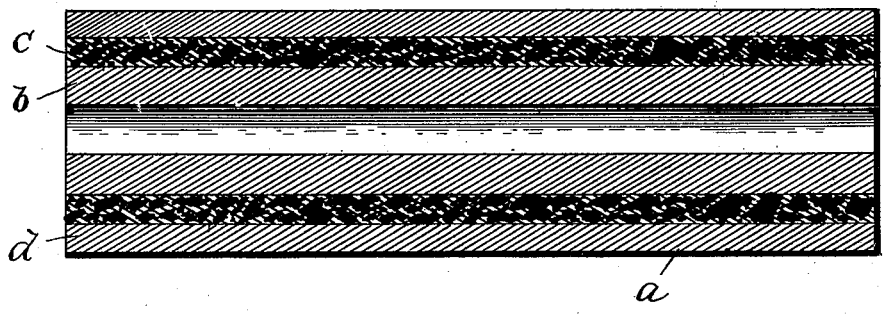
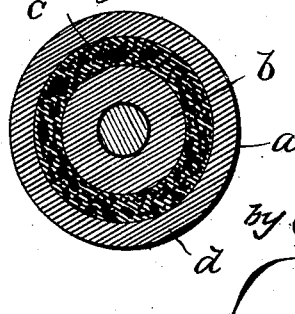
Witnesses
F. C. Barry
E. C. Duffy
Inventor
Geo. P. Dodge
by O. E. Duffy
Attorney

UNITED STATES PATENT OFFICE.

GEORGE P. DODGE, OF GREAT NECK, NEW YORK.

RUBBER ROLL.

SPECIFICATION forming part of Letters Patent No. 620,286, dated February 28, 1899.

Application filed February 23, 1897. Serial No. 624,682. (No model.)

*To all whom it may concern:*

Be it known that I, GEORGE P. DODGE, of Great Neck, in the county of Queens and State of New York, have invented certain new and useful Improvements in Rubber Rolls; and I do hereby declare that the following is a full, clear, and exact description of the invention, which will enable others skilled in the art to which it appertains to make and use the same, reference being had to the accompanying drawings, and to the letters of reference marked thereon, which form part of this specification.

This invention consists in certain new and useful improvements in wringer and other rubber rolls, and has for its object the provision of a roll simple, durable, and exceedingly cheap in construction.

A further object of the invention is to provide a roll composed of layers of different compounds of rubber so prepared as to vulcanize into one homogeneous roll of the desired elasticity and toughness.

A further object is to produce a roll of suitable softness with the use of very little pure rubber, thus reducing the cost to a minimum.

My invention consists in certain novel features of construction and in combinations of parts more fully described hereinafter and particularly pointed out in the claims.

Referring to the accompanying drawings, Figure 1 is a perspective view of a completed roll detached from the spindle. Fig. 2 is a central longitudinal section, and Fig. 3 is a cross-section.

$a$ is the completed roll.

$b$ is the thick inner core, made of cheap and preferably hard rubber secured to the spindle.

$c$ is the central cellular portion, spongy in character, soft, and flexible, and $d$ the outer cylindrical portion, preferably made of a thin layer of tough rubber close-grained to withstand the wear and tear to which the exterior of rubber rolls is subjected. The spongy portion or compound $c$ is preferably composed of rubber and the usual compounds and lump ammonia powdered and mixed in suitable proportions and is interposed between the rings or layers $b$ and $d$, and when subjected to the process of vulcanization it will become cellular and spongy and also become integral with the inner core $b$ and outer cylinder $d$.

Heretofore soft rubber could only be obtained by using high-class raw rubber and refraining from using much mixture or adulterants in its manufacture. This has rendered the price of soft rollers very dear. I now propose to obtain the desired softness of roll by mixing in the roll when in process of manufacture and before vulcanization a ring or rings or a layer more or less thick (as I may desire the necessary degree of softness) of rubber so prepared and compounded that when the necessary heat for vulcanization is applied it will sponge or become full of holes or air-cells. As rubber rolls are made of thin sheets of rubber rolled up around a mandrel or spindle, the process I adopt is an easy one, as it only requires the rubber specially prepared for sponging to form one or more layers in the process of rolling up the wringer-roll to the desired diameter.

Preferably I prepare the interior of the rubber roll of a very cheap grade of thick rubber, which will do its work as well as the best. On the outside of this interior cheap grade is placed the rubber so prepared as to sponge when put in the heat for vulcanization, and outside of all I roll or place a thin exterior of good rubber to resist the friction and wear and tear of the articles passing between the rolls. It will be seen that by this process any required degree of elasticity can be obtained not only without extra cost, but much more cheaply than with the ordinary roll, as the sponge mixture need not contain more than one-half to one-fourth or less of native rubber, which may be of a cheap grade mixed with the usual compounds or adulterants (in addition to the lump ammonia) and when vulcanized does not weigh as heavy as the solid mixture.

To obtain the spongy result, I preferably mix lump ammonia reduced to powder with the rubber about to be vulcanized for the formation of the sponge.

To illustrate the approximate amount of ammonia employed for the formation of the sponge, it may be stated that a roll ten inches long with a diameter of one and three-fourths inches and a bore of one-half inch diameter will weigh about one pound. Of this quantity of rubber about one-fifth will be converted into a spongy or cellular condition, and in practice I find that about two and three-fourths ounces of powdered ammonia will produce satisfactory results in a roll of the above weight. I do not, however, limit myself to these specific proportions, as the amount of the ammonia may be somewhat increased or decreased under certain conditions.

In case of native rubber being used too green or damp or steam being allowed to get to the rubber during the process of vulcanization it has frequently and accidentally happened that rolls have been spongy in their composition, especially on their exterior. This is detrimental, as the elasticity thereby produced is unevenly distributed, drying some parts of the clothes or material passing between the rolls and leaving other parts unwrung; but to produce and absolutely control this spongy rubber centrally within the roll just where elasticity is required is a benefit, making great saving in cost and a better article, a cheap rubber roll as flexible and effective as the dearest, besides obviating the difficulty which has sometimes been felt where rubber of great flexibility has been obtained by means of leaving out most of the compound—viz., that this very elasticity has rendered the rubber roll liable to turn on the metal spindle and not remain fastened thereon in the same firm manner as a more highly-compounded rubber would have done.

It is evident that various slight changes might be made in the forms, construction, and arrangements of the parts described without departing from the spirit and scope of my invention. Hence I do not wish to limit myself to the exact construction herein set forth, but consider myself entitled to all such changes.

Having thus fully described my invention, what I claim is—

1. A rubber roll composed of the inner thick core, of cheap rubber compound adapted to tightly embrace a spindle, a thin outer cylindrical coating or layer of tough rubber, and an intermediate layer of cellular or sponge rubber nearer the periphery than the center of the roll and all vulcanized together for the purpose set forth.

2. A rubber roll composed of the inner and outer layers of close-grained rubber and an intermediate layer of spongy or cellular rubber, and three layers being made integral during the process of vulcanization, substantially as described.

In testimony that I claim the foregoing as my own I affix my signature in presence of two witnesses.

GEORGE P. DODGE.

Witnesses:
 GEO. F. BARKER,
 JOHN H. BOGERT.